J. M. HENTON.
MOTOR DISK PLOW.
APPLICATION FILED MAY 14, 1912.
1,059,158.
Patented Apr. 15, 1913.
2 SHEETS—SHEET 1.
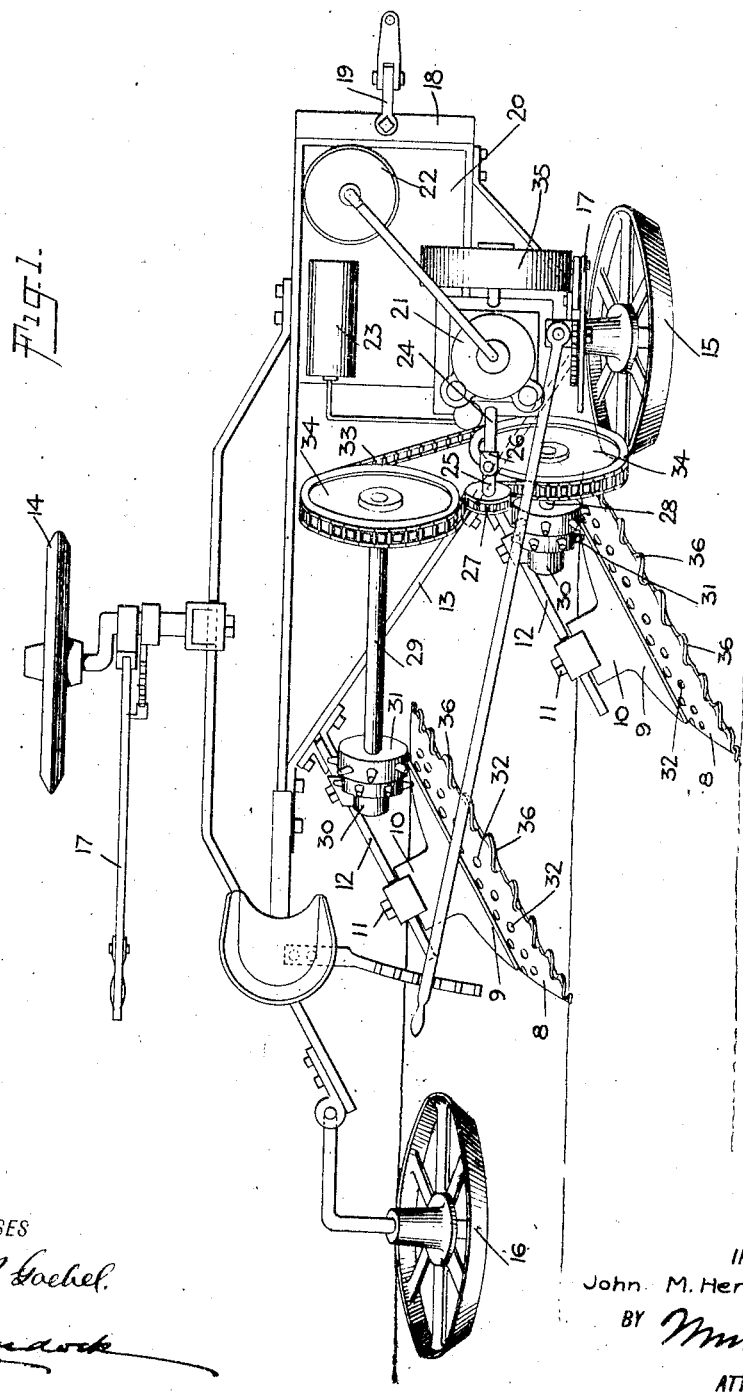
WITNESSES
INVENTOR
John M. Henton
BY
ATTORNEYS

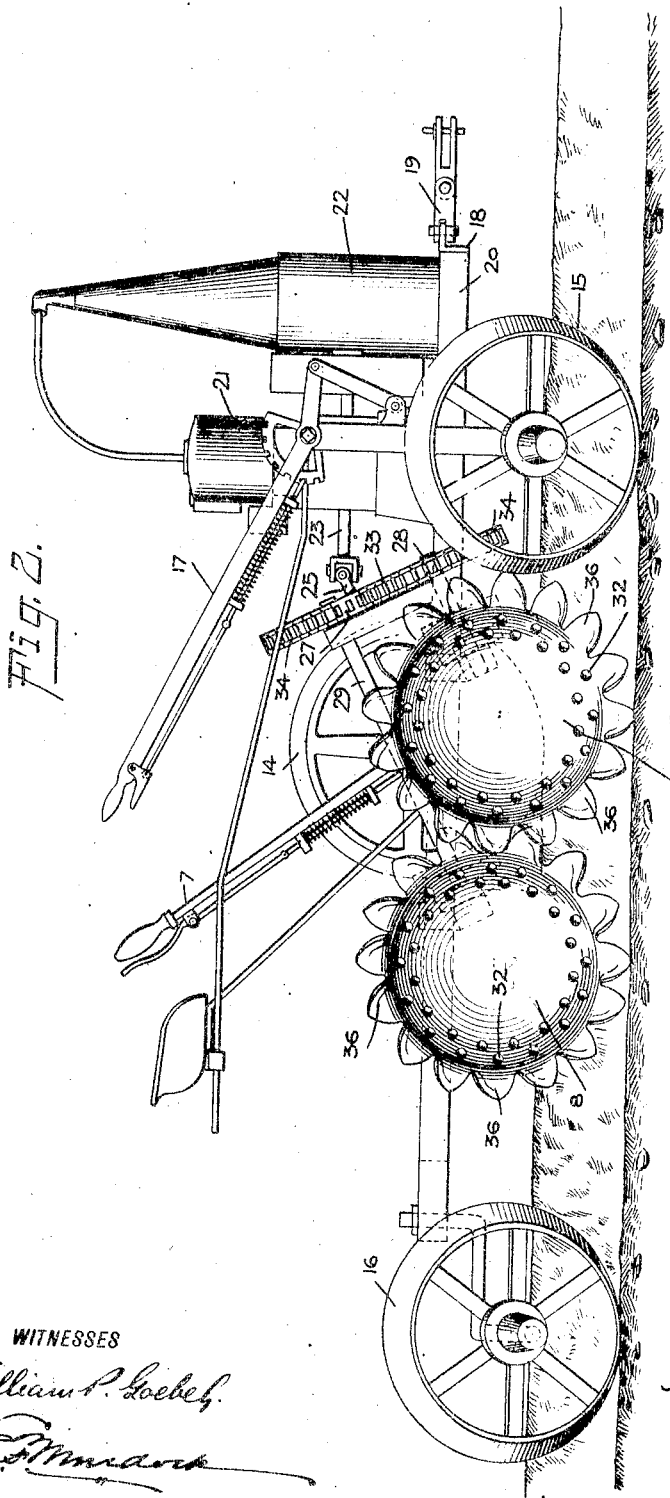
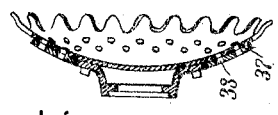
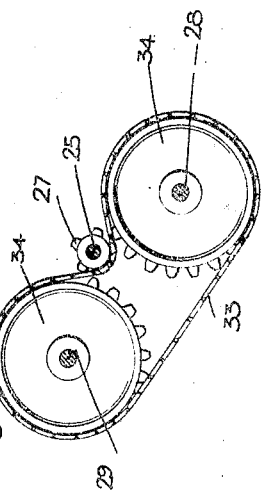

UNITED STATES PATENT OFFICE.

JOHN M. HENTON, OF EDGEMONT, SOUTH DAKOTA.

MOTOR DISK PLOW.

1,059,158.    Specification of Letters Patent.    Patented Apr. 15, 1913.

Application filed May 14, 1912. Serial No. 697,181.

*To all whom it may concern:*

Be it known that I, JOHN M. HENTON, a citizen of the United States, and a resident of Edgemont, in the county of Fall River and State of South Dakota, have invented a new and Improved Motor Disk Plow, of which the following is a full, clear, and exact description.

Among the principal objects which the present invention has in view are: to provide means for rotating the plowing disks employed in the invention independently of the progression of the plow; to provide means for rotating plowing disks at a variable speed greater than the travel of the plow; to provide means on the plowing disks for cross-cutting or grooving the bottom of furrows made by the disks; and to provide a simplified transmission mechanism whereby power is transmitted from an engine of suitable construction to plowing disks.

Reference is to be had to the accompanying drawings forming a part of this specification, in which similar characters of reference indicate corresponding parts in all the views, and in which—

Figure 1 is a plan view of a plow constructed and arranged in accordance with the present invention; Fig. 2 is a side elevation of the same, as seen from the furrow side of the plow; Fig. 3 is a detail view showing the coupling driving belt employed in the transmission mechanism; and Fig. 4 is a detail view, in cross section, of a modified construction of the plowing disk where is used a reinforcing back plate.

The plow disks 8 are each suitably mounted upon a back 9. The back 9 is provided with a suitable hub 10, to receive a bearing bolt 11. The bolts 11 are each mounted in a bracket 12, which bracket is extended from an angle beam 13 of the plow frame.

The plow frame is supported by a land wheel 14, a furrow wheel 15, and a caster wheel 16. The land and furrow wheels enumerated are each provided with a jack lever 17, whereby the frame and disks connected therewith may be raised and lowered on said wheels.

The frame is provided with a front or clevis bar 18, having a suitable clevis 19 pivotally mounted thereon, to which the draft team is hooked. As shown in the accompanying drawings, the plow is drawn by a team of horses, or by a suitable tractor.

The present frame is provided with a platform 20, upon which is mounted an internal combustion engine 21. The engine 21 is supplied from a gas or oil tank 22, and is cooled by a liquid normally carried in a tank 23. To the driving shaft 24 of the engine is coupled a short shaft 25 by means of a knuckle 26. The shaft 25, knuckle 26, and a sprocket wheel 27 fixedly mounted on said shaft 25, constitute what may be termed members of the transmission mechanism.

The transmission mechanism herein employed is provided to revolve shafts 28 and 29. The shafts 28 and 29 are suitably suspended in bearing brackets 30, and have each fixedly mounted thereon a pin wheel 31. The pins of the pin-wheels 31 engage holes 32 formed in the disks 8 adjacent the periphery thereof. The holes 32 are extended through the disks 8, and thus form free openings for the pins of the wheels 31 to provide ample clearness therefor, and to avoid the accumulation of dirt and grit therein.

The shafts 28 and 29 are connected by means of a belt chain 33, to secure the necessary uniform rotation of said shafts. For this purpose, each shaft is provided with a sprocket wheel 34, about which the belt is passed, and with the sprockets whereof the links of the said belt engage. The wheels 34, as will be seen best in Fig. 1 of drawings, are disposed at opposite sides of the wheel 27, and the belt which extends between the wheels 34 also engages the teeth of the wheel 27.

To steady the operation of the mechanism, the engine 21 is provided with a suitable weighted fly-wheel 35. With a mechanism thus constructed, it will be understood that when the engine 21 is operated, the shafts 28 and 29 have imparted thereto a uniform rotation, the speed of which is regulated by the speed of the engine, proportioned by the ratio of the diameters of the wheels 27 and 34. It will be seen that, as the result of the relatively rapid rotation imparted to the disks 8 by the shafts 28 and 29, the disks in the present plow differ in the operation from disks of ordinary construction and employment. A prominent result of the increased rotation of the disks 8 relative the rate of progression of the plow is, that the disks operate to pulverize the earth more perfectly, and to steady the operation of the plow, by relieving the same of a large proportion of the drift or pressure of the furrow and caster wheels against the land side of the furrow. This action, it will be understood, will be produced in disks having the usual sharpened and simplified cutting edge.

It is the further purpose of the invention, by the employment of the twisted teeth 36, to groove the bottom of the furrow transversely. It will be noted by reference to Fig. 1 of the drawings that the teeth 36 are twisted to aline substantially with the plane of the land side of the furrow. It will be understood that the path followed by each tooth, when traversing the furrow, will be curved, as the result of the progression of the plow and the rotation of the disk. In practice, the swath or groove cut or scraped by each of the teeth 36 is substantially transverse the line of the furrow. It will be understood that, as the rotary speed of the disks 8 is increased, the rearward inclination of the groove cut by the teeth 36 will increase, and that as the speed of the disk 8 is diminished, the angle of the groove cut by the teeth 36 will be increased. It has been found that, by the employment of a device of this character, whereby the bottom of the furrow is grooved, the drainage or washing of the soil, and the subsequent packing of the soil, to form a hard-pan, is materially lessened or avoided.

While I have herein illustrated and described the invention as applied only to the rotation of the disks 8 by independent means, such as the engine 21 carried on the frame of the plow, and while I have indicated that the traction of the plow as an implement is effected or accomplished by means such as a horse team, it will be understood that the natural operation of the disks will assist the traction of the implement, and under certain conditions will afford traction means therefor. I do not, however, deem that it is advisable to rely exclusively on the disk for the traction of the plow, as certain lands, such as bogs or marshy land, would prove unsuitable for this purpose.

In the modified form of the invention shown in Fig. 4 of the drawings a back plate 37 is employed, having holes 38, which register with the holes 32, to make the structure more rigid.

Having thus described my invention, I claim as new and desire to secure by Letters Patent:—

1. A disk plow, comprising a wheel-carried frame; a plowing disk mounted on said frame and provided adjacent the periphery thereof with a series of equally-spaced holes; an engine mounted on said frame; and a transmission mechanism connecting said engine and said disk, embodying a pin-wheel, the pins whereof engage and enter said holes in said disk.

2. A disk plow, comprising a wheel-carried frame adapted for movement by any suitable draft means; a plurality of plowing disks mounted on said frame and each provided with a series of engagement holes; an engine mounted on said frame; and a transmission gear operatively connecting said disks and said engine, for independently rotating said disks, said transmission gear embodying a plurality of pin wheels and shafts for the same operatively connected to rotate in the same direction, the pins of said pin-wheels adapted to engage the holes in said disks.

3. A disk plow, comprising a wheel-carried frame adapted for attachment to any suitable draft means; a plurality of plowing disks mounted on said frame, each of said disks having adjacent the periphery thereof a series of engagement holes; an engine mounted on said frame; and a transmission mechanism operatively connecting said engine and said disks, to independently rotate said disks, said transmission mechanism embodying a plurality of driving shafts, each having a pin-wheel, the pins whereof engage the holes in said disks, a plurality of sprocket wheels, one mounted on each of said shafts, a connecting chain for engaging each of said wheels, and a driving sprocket wheel operatively connecting said chain and the driving shaft of said engine.

In testimony whereof I have signed my name to this specification in the presence of two subscribing witnesses.

JOHN M. HENTON.

Witnesses:
  W. F. WYATT,
  ALICE W. WYATT.